United States Patent [19]
Murakami et al.

[11] Patent Number: 4,577,201
[45] Date of Patent: Mar. 18, 1986

[54] FLUID DROPLET EJECTING SYSTEM

[75] Inventors: Kiyotaka Murakami, Hino; Yoshiaki Kimura, Hachioji, both of Japan

[73] Assignee: Konishiroku Photo Industry Co. Ltd., Tokyo, Japan

[21] Appl. No.: 577,132

[22] Filed: Feb. 6, 1984

[30] Foreign Application Priority Data

Feb. 5, 1983 [JP] Japan ................................ 58-18460

[51] Int. Cl.[4] ........................................ G01D 15/16
[52] U.S. Cl. ............................ 346/140 R; 310/317; 310/332
[58] Field of Search .................. 346/140 R; 310/317, 310/332

[56] References Cited

U.S. PATENT DOCUMENTS 4,237,399 12/1980 Sakamoto ........................ 310/317
4,284,996 8/1981 Greve ............................ 346/140 R
4,385,304 5/1983 Sniderman ...................... 346/140 R
4,459,601 7/1984 Howkins ........................ 346/140 R
4,471,363 9/1984 Hanaoka ........................ 346/140 R

*Primary Examiner*—Joseph W. Hartary
*Attorney, Agent, or Firm*—Frishauf, Holtz, Goodman & Woodward

[57] ABSTRACT

In an on-demand type ink-jet recording apparatus, which includes an ink chamber and a polarized piezoelectric element coupled to the ink chamber, the piezoelectric element being polarized as a result of application of a voltage of given polarity thereacross, ink droplets are ejected by applying droplet-ejecting pulses of opposite polarity to that used in polarization of the piezoelectric element for ejecting ink droplets from the nozzle for recording on a recording medium. In order to prevent loss of polarization of the piezoelectric element due to the application of the droplet-ejecting pulses, additional polarization-loss-preventing pulses of opposite polarity (same polarity as that used in polarization treatment of the piezoelectric element) are applied at predetermined points of time to the piezoelectric element to prevent loss of polarization thereof.

10 Claims, 13 Drawing Figures

FLUID DROPLET EJECTING SYSTEM

BACKGROUND OF THE INVENTION

1. Field of the Invention

The present invention relates to a fluid droplet ejecting system and more particularly to an ink-jet recording apparatus which comprises a piezoelectric element and a nozzle having a liquid chamber and which is so constructed that the piezoelectric element is driven by pulse voltages to apply pressure to the liquid chamber to thereby eject the liquid in the form of fluid droplets.

2. Description of the Prior Art

Existing ink jet recording devices of the prior art are first summarized below:

If to a nozzle-having liquid chamber is applied pressure so that, for example, the inside volume of the liquid chamber contracts, then the liquid inside the liquid chamber becomes compressed thereby to be ejected from the nozzle of the liquid chamber. If the pressure is applied suddenly to the liquid chamber, then the liquid also is compressed suddenly, causing the liquid ejected from the nozzle to become fine fluid droplets.

If an ink is used as the liquid inside the liquid chamber and a recording medium such as a sheet of recording paper is provided in front of the nozzle and when the above operation is effected in accordance with recording signals (pulse voltages), then the ink droplets ejected from the nozzle strike the recording paper, thus forming ink dots on the recording paper. In this operation if, for example, the recording paper is moved in the vertical direction, while the nozzle is moved in the lateral direction, then the dot recording can be made to form desired character or letter patterns over the whole area of the recording paper.

Such the above-described recording apparatus, as the on-demand-type ink-jet recording apparatus, is already on the market.

The on-demand-type ink-jet recording apparatus is not one recording dots on a recording sheet by the impact of a wire as in wire-dot-type printers but one in which the minute ink droplets jetted from the nozzle strike a recording sheet to thereby form dots thereon, so that the recording can be carried out very quietly. As means for applying pressure to the ink liquid if, for example, a piezoelectric element is used which has a nature of being strained by the application of voltages thereto, the number of driving means necessary for the recording can be reduced, allowing to make the apparatus compact and to shorten the recording operation period.

Namely, the on-demand-type ink-jet recording apparatus is capable of making recording operation much more noiselessly and faster than does the wire-dot-type printer and, besides, can be of a compact type. Further, the apparatus allows the use of a plurality of inks different in color to make superposed printings at same points on a recording sheet, thereby enabling to produce a multicolor recording comprising not only the colors of individual inks themselves but also a variety of mixed colors.

In the on-demand-type ink-jet recording apparatus, in order to record a high-density and high-resolution information on a recording sheet, it is necessary to minimize the size of each of the dots to be recorded on a recording sheet, and for this purpose, the size of each of the droplets to be ejected from the nozzle must be minimized.

Further, in recording an image or the like on a recording sheet, multistage change in the density is necessary. The multistage change in the density can be carried out by changing the number of dots per unit area on a recording sheet. For example, a high-density recording can be obtained by increasing the number of dots, while a low-density recording can be obtained by reducing the number of dots. However, this method has its limit to the representation of halftone gradation.

In order to change the density by multiple stages it is necessary to change not only the number of dots per unit area but also dot size.

That is, in the on-demand-type ink-jet recording apparatus, in order to record a high-density, high-resolution and multistage-density information on a recording sheet, it is desirable that the size of the droplet ejected from the nozzle be minimized.

Minimization of the size of the droplet to be ejected from the nozzle is considered able to be attained by minimizing the diameter of the orifice of the nozzle, but this tends to cause the nozzle to be clogged and to increase the friction of an ink with the nozzle orifice, so that the ink is hardly ejected from the nozzle. There is naturally a limit to minimizing the diameter of the nozzle orifice with relation to the fluidity of the ink liquid that passes through the nozzle.

For increasing the density of information to be recorded on a recording sheet there is also a method which utilizes satelite droplets, much smaller fluid droplets, that are formed secondarily behind the ink droplets when ejected from the nozzle. Since the main droplets and satelite droplets that are ejected from the nozzle are ejected in the same direction, their striking points, if no manipulation is applied thereto, are the same. In order to minimize the size of each of the dots to be recorded on a recording sheet, satelight droplets alone must be used with manipulation to prevent the main droplets from arriving at the recording sheet. For this reason, means for charging and deflecting the main droplets and a device for recovering the unused main droplets are required, so that the recording apparatus needs to be of a large size and becomes expensive.

In an effort to minimize the size of each of the droplets to be ejected from the nozzle to minimize the size of each of the dots to be recorded on a recording sheet there Was devised a device which lowers pulse voltages to be applied to an electric-mechanical converter to thereby lower the pressure to be applied to the ink liquid inside the ink chamber.

However, it has been found out that even this device can hardly minimize the size of the ink droplet. The ink chamber, electric-mechanical converter, and the like, which constitute the ink-ejecting apparatus, have their own intrinsic oscillation frequencies. If the oscillation frequency produced by the pulse voltage to be applied to the electric-mechanical converter is not coincident with the foregoing intrinsic oscillation frequency and does not resonate, then ink droplets of a given uniform size are ejected efficiently from the nozzle by the applied pressure, but if the oscillation frequency produced by the pulse voltage to be applied to the electric-mechanical converter is identical in the frequency component with the resonant oscillation frequency, ink droplets are not sufficiently ejected from the nozzle.

As has been described, these existing techniques are unable to readily have any desired small size droplets ejected from the nozzle.

As a result of our investigation it has now been found out that even where the same pulse voltage is applied to the electric-mechanical converter, the position of the tip end of the ink liquid inside the nozzle at the time when the pulse voltage is applied has relation to the droplet size.

That is, even when the same pulse voltage is applied to the electric-mechanical converter, the droplets ejected from nozzle 4 differs in the size between when the tip end of ink liquid 3 inside nozzle 4 of ink chamber 2 comes up to the orifice of nozzle 4 as shown in FIG. 1(*a*) and when the tip end of ink liquid 3 inside nozzle 4 is at a certain distance from the orifice of nozzle 4 as shown in FIG. 1(*b*).

If the diameter of an ink droplet is taken for the axis of ordinate and the distance l between the orifice of nozzle 4 and the tip position of ink liquid 3 is taken for the axis of abscissa, then the droplet size changes as shown in FIG. 2 even when the same pulse voltage is applied.

In an ink-jet recording head as shown in FIG. 3(*a*), when a pulse voltage as shown in FIG. 4(*a*) is applied to the piezoelectric element 1 provided on the wall of ink chamber 2, if the wall of ink chamber 2 is strained to be bent as, e.g., indicated with the assumed lines, every time when the pulse voltage is applied, then ink liquid 3 inside chamber 2 becomes compressed to thereby eject ink liquid 3 in the form of droplets from nozzle 4.

If to the foregoing piezoelectric element 1 of the ink-jet head is applied as shown in FIG. 4(*b*) a pulse voltage of the opposite polarity to that of FIG. 4(*a*), then this time the wall of ink chamber 2 having thereon piezoelectic element 1 is strained to be bent outward to increase the volume of chamber 2 as shown in FIG. 3(*b*). And when the pulse voltage applied to piezoelectric element 1 is stopped to thereby return the wall having thereon the piezoelectric element to the original position, the pressure caused by the return is applied to ink liquid 3 to thereby eject ink droplets from nozzle 4.

The bending direction of piezoelectric element 1, depending on the polarity of the voltage applied, becomes opposite, but any of both polarities can put pressure upon the ink liquid inside the chamber to eject ink droplets 5 from nozzle 4.

In comparison of FIG. 3(*a*) with FIG. 3(*b*), the droplet size when ejected from nozzle 4 of the ink-jet printing head as shown in FIG. 3(*b*) becomes smaller for the following reason.

In the case of FIG. 3(*b*), when a pulse voltage is applied to piezoelectric element 1, the element is strained so as to increase the volume of chamber 2, so that the pressure of the liquid inside chamber 2 is reduced. The reduction of the pressure inside chamber 2 causes ink liquid 3 inside nozzle 4 to be drawn back toward the chamber side, so that the distance l between the tip of nozzle 4 and the tip position of ink liquid 3 becomes elongated as shown in FIG. 1(*b*). Accordingly, the ink-jet printing head shown in FIG. 3(*b*) is considered to eject smaller droplets from the nozzle than those in the case of FIG. 3(*a*).

On the other hand, the piezoelectric element, during its manufacture, is subjected to a voltage in a certain direction in order to align the polarization direction. The piezoelectric element is made of a ferrodielectric material. When the same polar voltage as that in the polarization treatment is applied, the polarization direction is consolidated, but when the opposite polar voltage is applied repeatedly to the piezoelectric element, the polarization direction becomes disturbed, so that even when a pulse voltage is applied, the degree of the strain becomes reduced, no expected pressure is put on the liquid, and therefore no droplets are ejected from the nozzle. As far as the piezoelectric element is made of a ferrodielectric material, such the phenomenon is unavoidable. Up to now, in the case where a voltage of the opposite polarity to that in the polarization treatment was applied to the piezoelectric element, when the degree of the strain became lowered, the piezoelectric element had to be replaced with a new one.

OBJECT AND SUMMARY OF THE INVENTION

It is therefore an object of the present invention to provide a means which, even when a voltage of the opposite polarity to that in the polarization treatment is applied to the piezoelectric element, is capable of reducing the disturbance of the polarization direction and of elongating the life of the piezoelectric element.

The above object can be accomplished by the following ink droplet ejecting apparatus: In an ink droplet ejecting apparatus which is so constructed that by or after applying to the piezoelectric element a pulse voltage of the opposite polarity to that in the polarization treatment of the piezoelectric element, pressure is applied to the ink chamber having a nozzle to thereby eject ink droplets from the nozzle, the said ink droplet ejecting apparatus in which to the said piezoelectric element is applied at each of desired points of time at least one pulse voltage of the same polarity as that in the polarization treatment of the piezoelectric element.

According to the present invention, the disturbance of the polarization direction by applying to the piezoelectric element a voltage of the opposite polarity to that in the polarization treatment of the piezoelectric element can be restored to the normal direction by applying at each of desired points of time a voltage of the positive polarity to the piezoelectric element to thereby maintain the foregoing effect over an extensive period of time.

DETAILED DESCRIPTION OF THE INVENTION

The present invention will be illustrated in detail by the following examples with reference to the drawings.

The piezoelectric element is one that is produced by applying a strong voltage to and consolidating the polarization direction of the sinter of such a material showing a ferrodielectricity as barium titanate, lead titanate-zirconate (under the trade name "PZT" obtained commercially from Clevite Corp.), and the like.

Figure 5A:
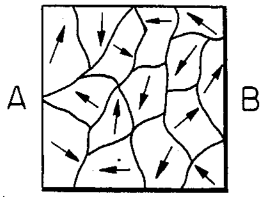
PRIOR ART FIG. 5a
FIG. 5(*a*) and FIG. 5(*b*) are drawings showing the difference in the polarization direction between before(a) and after(b) the polarization treatment of the piezoelectric element during the manufacture thereof.
Figure 5B:
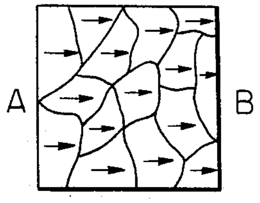
PRIOR ART FIG. 5b

The sintering alone of such a material as barium titanate, lead titanate-zirconate, or the like, is not enough to consolidate the polarization direction of the crystal as shown in FIG. 5(*a*). By effecting such a polarization treatment that, for example, a positive voltage is applied to A and a negative voltage to B, the polarization direction can be consolidated as shown in FIG. 5(*b*), whereby the desired characteristic as of the piezoelectric element appears. If to the piezoelectric element is applied a voltage of the same polarity as that used in the above polarization treatment, power is put on toward consolidating the polarization direction, thereby maintaining over an extensive period the characteristic as of the piezoelectric element, i.e., the characteristic of being strained by the application of a voltage.

However, if a voltage of the opposite polarity to that used in the polarization treatment is applied to the piezoelectric element, power is put upon the element to reverse the polarization direction thereof. When the piezoelectric element is subjected to a voltage of the opposite polarity to that in the polarization treatment, the consolidated polarization direction of such a crystal as barium titanate, lead titanate-zirconate, or the like, which consitutes the piezoelectric element, becomes disturbed. Accordingly, if the piezoelectric element is used over a long period with the application thereto of a voltage of the opposite polarity to that used in the polarization treatment, then the polarization direction of each crystal becomes largely disturbed, so that the disturbance reduces the piezoelectric element's own nature, i.e., the degree of being strained by the application of pulse voltages, thus leading to putting no pressure upon the ink liquid, whereby ink droplets can hardly be ejected from the nozzle. However, even where a voltage of the opposite polarity to that in the polarization treatment is applied to the piezoelectric element to thereby eject ink droplets from the nozzle, if an action is taken so that the polarization direction of the piezoelectric element be always consolidated, it would be obvious that the piezoelectric element could carry out its expected role over a long period.

The piezoelectric element is subjected to polarization treatment during its manufacture, so that its polarization direction is fixed. We have found that even when this piezoelectric element is subjected to a voltage of the opposite polarity to disturb the polarization direction (i.e., subjected to droplet-ejecting pulses), if to this element is applied a voltage of the same polarity as that used in the polarization treatment, then the polarization direction becomes consolidated as in the polarization treatment to become free of the disturbance of the polarization direction.

The present invention, therefore, is such that, in an ink-jet recording apparatus whose piezoelectric element is driven by the opposite polarity to that used in the polarization treatment to thereby eject ink droplets from the nozzle, the same polarity voltage pulse as used in the polarization treatment (i.e., a polarization-loss-preventing pulse) is applied before the degree of the strain of the piezoelectric electric element becomes lowered to prevent the disturbance of the polarization direction.

Figure 6:
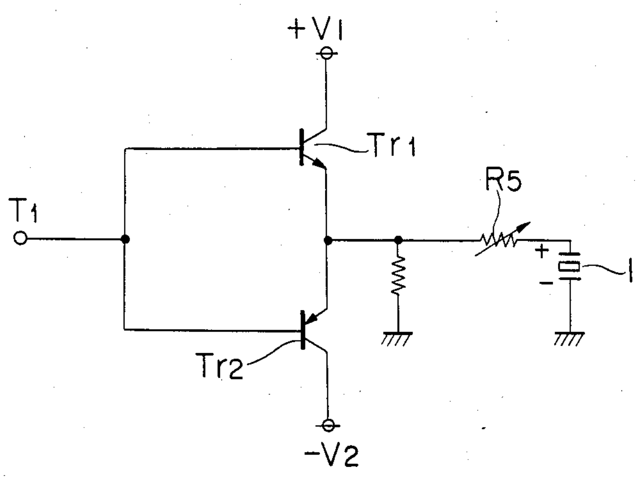
FIG. 6 and FIG. 7 illustrate circuits for driving the piezoelectric element in accordance with the examples of the present invention.

FIG. 6 is a circuit diagram for driving the piezoelectric element in accordance with an example of the present invention.

When a pulse signal (negative polarity) for ejecting ink droplets from the nozzle is fed to input terminal $T_1$, transistor $Tr_2$ is turned on. When transistor $Tr_2$ is turned on, a closed circuit is formed by power supply $V_2$ connected to between the collector of transistor $Tr_2$ and the negative terminal of piezoelectric element 1. The positive terminal of power supply $V_2$ is connected to ground, and the negative terminal of piezoelectric element 1 is connected to ground. The voltage of power supply $V_2$ is applied as of the opposite polarity through transistor $Tr_2$ and variable resistor $R_5$ to piezoelectric element 1. To the base of transistor $Tr_2$ is applied a negative voltage to turn transistor $Tr_2$ on, then to piezoelectric element 1 is applied voltage $V_2$ as of the opposite polarity, and piezoelectric element 1 is then driven to thereby eject ink droplets from the nozzle (see, e.g., FIG. 3(*a*)).

If a positive voltage is applied to input terminal $T_1$, then transistor $Tr_1$ is turned on, and voltage $V_1$ is applied through variable resistor $R_5$ to the positive terminal of piezoelectric element 1. The negative terminal of piezoelectric terminal 1 is connected to ground, and to the ground is connected the negative terminal of power supply $V_2$, so that the voltage of $V_1$ is applied as of the positive polarity through transistor $Tr_1$ and variable resistor $R_5$ to piezoelectric element 1.

Figure 8A:
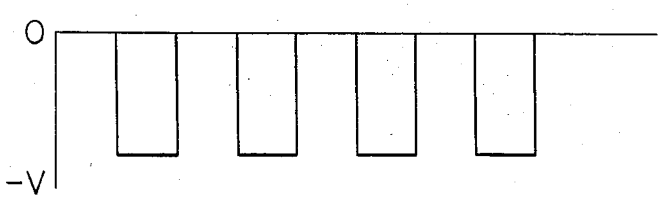
PRIOR ART FIG. 8a
FIG. 8(*a*) and FIG. 8(*b*) are waveform drawings of pulse voltages to be applied to the piezoelectric elements of a conventional example and of the example of the present invention, respectively.
Figure 8B:
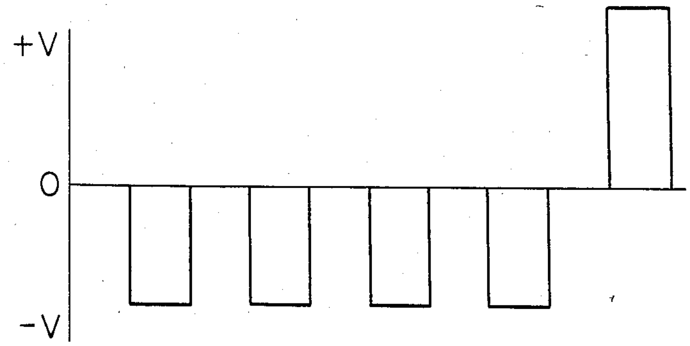

Even when piezoelectric element 1 is used with the application thereto of a voltage of the opposite polarity to that used in the polarization treatment, if, as described above, a positive voltage is applied to input terminal $T_1$ and a voltage of the positive polarity to piezoelectric element 1, then the disturbance of the polarization direction is vanished, thus restoring the direction to normal. FIGS. 8(*a*)and (*b*)thus are waveform drawings of pulse voltages to be applied to the piezoelectric element in accordance with a conventional example and the example of the present invention, respectively.

Figure 7:
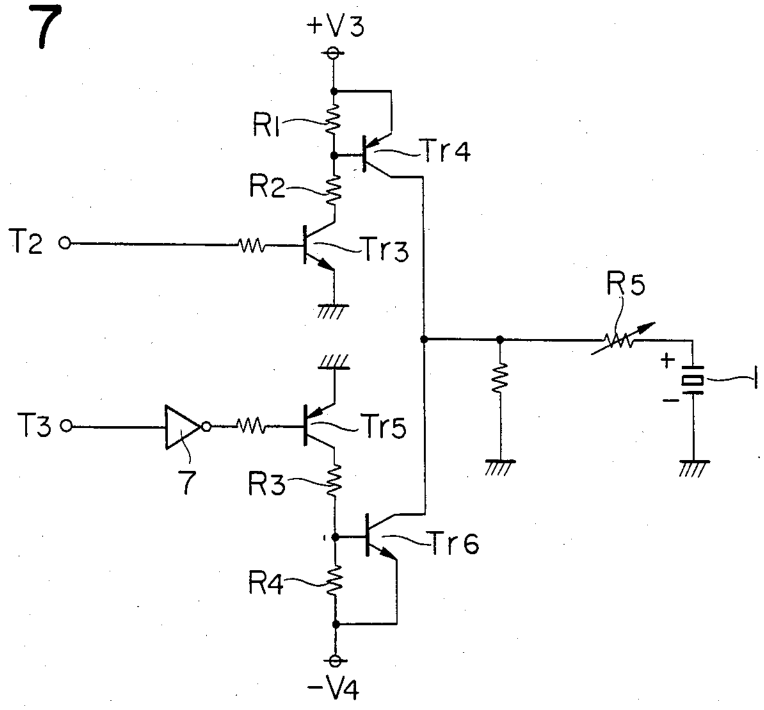

FIG. 7 is an electric circuit for driving the piezoelectric element in another example of the present invention.

In the electric circuit of FIG. 6, the pulse voltage signal (negative voltage) for driving piezoelectric element 1 to thereby eject ink droplets and the pulse voltage signal (positive voltage) for consolidating the polarization direction of piezoelectric element 1 are fed to the same input terminal $T_1$, and the polarity to be applied to piezoelectric element 1 is varied according to whether the input signal is positive or negative.

While in the electric circuit of FIG. 7, the input terminals for the pulse voltage signal for ejecting ink droplets and for the pulse voltage signal for the restoration of the polarization direction are separately provided to thereby cause piezoelectric element 1 to operate positively.

If to input terminal $T_3$ is fed the pulse voltage signal (positive) for ejecting ink droplets, then a negative voltage that has been inverted by inverter 7 is applied to the base of trasistor $Tr_5$. When the base of transistor $Tr_5$ becomes negative, then transistor $Tr_5$ is turned on, whereby an electric current runs through transistor $Tr_5$, resistor $R_3$ and resistor $R_4$ to the power supply. The voltage drop caused when the electric current runs through resistor $R_4$ is transmitted to between the base of transistor $Tr_6$ and an emitter, whereby transistor $Tr_6$ is turned on. When transistor $Tr_6$ is turned on, supply voltage $V_3$ is applied as of the opposite polarity through variable resistor $R_5$ to piezoelectric element 1 to thereby eject ink droplets from the nozzle.

Next, when to input terminal $T_2$ is fed the pulse voltage signal (positive) for consolidating the polarization direction, transistor $Tr_3$ is turned on to thereby cause an electric current to run through resistor $R_1$ and resistor $R_2$. The electric current running through resistor $R_1$ produces a voltage between both ends of resistor $R_1$, and the voltage is applied to between the emitter and base of transistor $Tr_4$, thus turning transistor $Tr_4$ on. When transistor $Tr_4$ is turned on, supply voltage $V_3$ is applied through variable resistor $R_5$ to piezoelectric element 1, whereby the disturbance of the polarization of piezoelectric element 1 is restored to normal.

According to our experiments, the pulse voltage of the positive polarity for the restoration of the polarization direction is applied to piezoelectric element 1 in a proportion of at least one pulse to up to 200,000 pulses of the pulse voltage of the opposite polarity to thereby enable to obtain satisfactory ink droplet ejecting characteristics.

And the pulse voltage of the positive polarity, when increased by 1 to 15 times the absolute value of the pulse voltage of the opposite polarity, can restore the disturbed polarization direction to normal.

The ink-jet printing head used in the experiments is of the Kyser type, wherein the thickness of the chamber wall having thereon the piezoelectric element is from 0.1 to 0.5 mm, the thickness of the piezoelectric element is from 0.1 to 0.6 mm, and the diameter of the nozzle orifice is from 40 to 60 $\mu m\ \phi$.

Figure 1A:
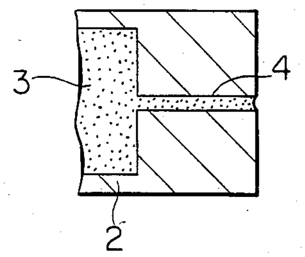
PRIOR ART FIG. 1a
FIG. 1(*a*) and FIG. 1(*b*) are enlarged sectional views of different conditions of the nozzle portion of an ink-jet printing head.
Figure 1B:
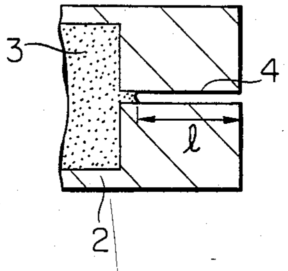
PRIOR ART FIG. 1b
Figure 2:
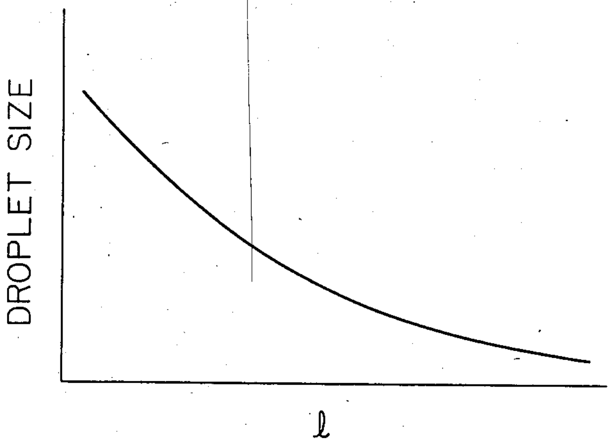
PRIOR ART FIG. 2
FIG. 2 is a graph showing the relation between the tip position of the ink liquid inside the nozzle and the droplet size.
Figure 3A:
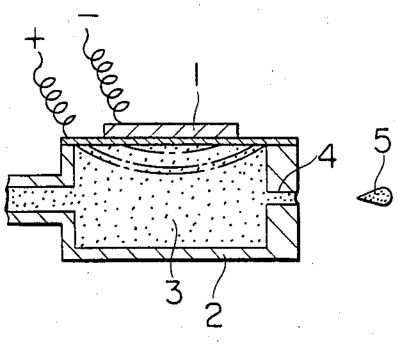
PRIOR ART FIG. 3a
FIG. 3(*a*) and FIG. 3(*b*) are enlarged sectional views of different conditions of the ink-jet printing head.
Figure 3B:
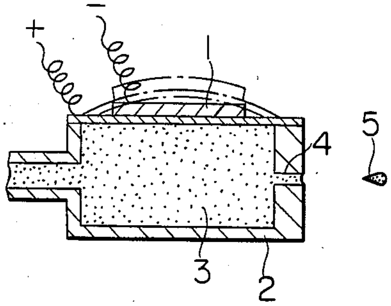
PRIOR ART FIG. 3b
Figure 4A:
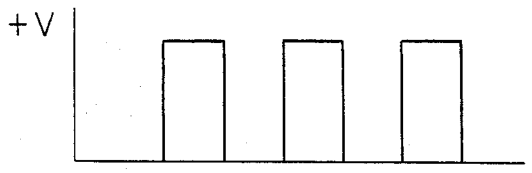
PRIOR ART FIG. 4a
FIG. 4(*a*) and FIG. 4(*b*) are waveform drawings of pulse voltages different in the polarity applied to the piezoelectric element.
Figure 4B:
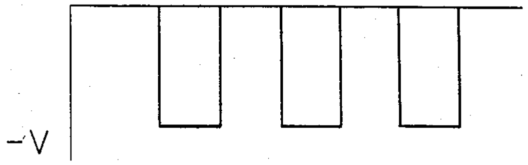
PRIOR ART FIG. 4b

In the above-described ink-jet printing head, in the case of means for applying a voltage of the same polarity as that used in the polarization treatment to the piezoelectric element, the limit of the droplet size is from 70 to 90 $\mu m\ \phi$, but in the case of applying a voltage of the opposite polarity to that used in the polarization treatment to the piezoelectric element (e.g., FIG. 3(*a*)and (*b*)), the size of the droplets ejected from the nozzle can be made from 40 to 60 $\mu m\ \phi$.

What is claimed is:

1. In an on-demand type ink-jet recording apparatus comprising:

an ink-jet printer head including an ink chamber, a polarized piezoelectric element coupled to said ink chamber, said piezoelectric element being polarized as a result of application of a voltage of given polarity thereacross to thereby effect a polarization treatment thereof, a nozzle in communication with said ink chamber and from which an ink droplet is to be ejected, an ink supplying passage through which ink is supplied to the ink chamber, and means for applying to said piezoelectric element a droplet-ejecting pulse voltage of only the opposite polarity to that used in said polarization treatment for ejecting an ink droplet from said nozzle for recording on a recording medium, the improvement comprising:

means for applying to said piezoelectric element at least one polarization-loss-preventing pulse of the same polarity as that used in said polarization treatment at predetermined points of time not for recording but to prevent loss of polarization of said piezoelectric element due to application of said opposite polarity droplet-ejecting pulses, said at least one polarization-loss-preventing pulse being applied after application of a plurality of said droplet-ejecting pulses.

2. The apparatus of claim 1, wherein said at least one polarization-loss-preventing pulse is applied to said piezoelectric element periodically.

3. The apparatus of claim 1, wherein said at least one polarization-loss-preventing pulse is a pulse voltage of from 1 to 15 times the magnitude of said droplet-ejecting pulse.

4. The apparatus of claim 2, wherein said polarization-loss-preventing pulse is a pulse voltage of positive polarity for the restoration of the polarization direction, said positive polarity pulse voltage being applied to said piezoelectric element in a proportion of at least one positive polarity pulse to up to 200,000 pulses of said opposite polarity droplet-ejecting pulses.

5. The apparatus of claim 1, wherein said polarization-loss-preventing pulse is a pulse voltage of positive polarity for the restoration of the polarization direction, said positive polarity pulse voltage being applied to said piezoelectric element in a proportion of at least one positive polarity pulse to up to 200,000 pulses of said opposite polarity droplet-ejecting pulses.

6. In an on-demand type ink-jet recording apparatus comprising:

an ink-jet printer head including an ink chamber, a polarized piezoelectric element coupled to said ink chamber, said piezoelectric element being polarized as a result of application of a voltage of given polarity thereacross to thereby effect a polarization treatment thereof, a nozzle in communication with said ink chamber and from which an ink droplet is to be ejected, and an ink supplying passage through which ink is supplied to the ink chamber, the improved method comprising:

applying to said piezoelectric element a droplet-ejecting pulse voltage of only the opposite polarity to that used in said polarization treatment for ejecting an ink droplet from said nozzle for recording on a recording medium, and applying to said piezoelectric element at least one polarization-loss-preventing pulse of the same polarity as that used in said polarization treatment at predetermined points of time not for recording but to prevent loss of polarization of said piezoelectric element due to application of said opposite polarity droplet-ejecting pulses, said at least one polarization-loss-preventing pulse being applied after application of a plurality of said droplet-ejecting pulses.

7. The apparatus of claim 6, comprising applying said at least one polarization-loss-preventing pulse to said piezoelectric element periodically.

8. The apparatus of claim 6, wherein said at least one polarization-loss-preventing pulse is a pulse voltage of from 1 to 15 times the magnitude of said droplet-ejecting pulse.

9. The apparatus of claim 7, wherein said polarization-loss-preventing pulse is a pulse voltage of positive polarity for the restoration of the polarization direction, said positive polarity pulse voltage being applied to said piezoelectric element in a proportion of at least one positive polarity pulse to up to 200,000 pulses of said opposite polarity droplet-ejecting pulses.

10. The apparatus of claim 6, wherein said polarization-loss-preventing pulse is a pulse voltage of positive pllarity for the restoration of the polarization direction, said positive polarity pulse voltage being applied to said piezoelectric element in a proportion of at least one positive polarity pulse to up to 200,000 pulses of said opposite polarity droplet-ejecting pulses.

* * * * *

UNITED STATES PATENT AND TRADEMARK OFFICE

CERTIFICATE OF CORRECTION

PATENT NO. : 4,577,201

DATED : March 18, 1986

INVENTOR(S) : Kiyotaka Murakami et al.

It is certified that error appears in the above-identified patent and that said Letters Patent is hereby corrected as shown below:

COLUMN 9, line 5, change "pllarity" to --polarity--.

Signed and Sealed this

*Twenty-sixth* Day of *August 1986*

[SEAL]

*Attest:*

DONALD J. QUIGG

*Attesting Officer* *Commissioner of Patents and Trademarks*